(12) United States Patent
Xiong

(10) Patent No.: US 6,479,091 B1
(45) Date of Patent: Nov. 12, 2002

(54) **BEVERAGE CONTAINING HYBRID *RUMEX ACETOSA* L. AND METHODS FOR PREPARING SAME**

(76) Inventor: Jungong Xiong, 8F, No. 110, Youhaonan Road, Urumqi, Zinjiang, 830000 (CN)

( * ) Notice: Subject to any disclaimer, the term of this patent is extended or adjusted under 35 U.S.C. 154(b) by 0 days.

(21) Appl. No.: 09/700,006

(22) PCT Filed: Dec. 30, 1998

(86) PCT No.: PCT/CN98/00318

§ 371 (c)(1),
(2), (4) Date: Jan. 8, 2001

(87) PCT Pub. No.: WO99/58002

PCT Pub. Date: Nov. 18, 1999

(30) Foreign Application Priority Data

May 12, 1998 (CN) ......................................... 98101848 A

(51) Int. Cl.⁷ ................................ A23L 2/02; A23L 2/04

(52) U.S. Cl. ............................ 426/590; 426/61; 426/51; 426/599

(58) Field of Search .................................. 426/590, 599, 426/51

(56) References Cited

FOREIGN PATENT DOCUMENTS

JP          63313549       * 12/1988

* cited by examiner

*Primary Examiner*—Helen Pratt
(74) *Attorney, Agent, or Firm*—Fulbright & Jaworski L.L.P.

(57) ABSTRACT

The invention relates to the use of hybrid *Rumex acetosa* L. in production of beverage, wherein the fresh hybrid *Rumex acetosa* L. is extracted to produce juice or whole pulp beverage, or hydrolyzed to produce amino acids-rich beverage. The resulting beverage has high content of amino acids, protein and carotene. It also contains various kinds of microelements, chlorophyll, organo-selenium and high content of vitamin C.

8 Claims, No Drawings

BEVERAGE CONTAINING HYBRID *RUMEX ACETOSA* L. AND METHODS FOR PREPARING SAME

FIELD OF INVENTION

The invention relates to a method of preparing plant vegetable type beverage, especially relates to new use of hybrid *Rumex acetosa* L. in production of beverage and the method thereof.

BACKGROUND OF INVENTION

With the development of national economy and the elevation of people's living standard, various outstanding beverages appear on the market without an end. As for the classification of them by raw materials of which they made, however there are only three types, namely, original fruit juice taste type such as Hui Yuan fruit juice with fresh keeping package, completely compound type beverage such as Coca Cola, Sprit etc, and mixed original juice type such as different taste of aerated waters. But beverages made from pure natural plant vegetables are not common on the market.

The hybrid *Rumex acetosa* L. has been examined and certified by National Herbage Species Exam & Certify Committee as a new species of herbage, and a credential as a qualified national herbage species has been issued with a registered number 183. The hybrid acetosa is a *Rumex acetosa* L. of knotweed family, belonging to perennial herb, with *Rumex patientia* L. as its female parent and *Rumex tianschanica* L. as its male parent Hybrid *Rumex acetosa* L. is a new breed of green product with high protein, high vitamin C and high carotene. It possesses series of features such as high productivity, long life, good anti-frigid and good anti-drought property, high protein content and full and balance nutrition. Variation of its nutrition contents during different growing periods are shown in following table:

TABLE 1

| | Period Growing period | | | | |
|---|---|---|---|---|---|
| Items | Leaf cluster | Stemming | Budding | Earlier flowering | Re-flowering |
| Dry substances | 8.68 | 10.79 | 10.97 | 11.90 | 12.78 |
| Protein | 38.94 | 39.81 | 29.94 | 27.81 | 20.56 |
| Nitrogen free extracts | 33.67 | 30.74 | 34.50 | 42.98 | 38.93 |
| in which Sugar | 13.54 | 9.87 | 15.39 | 5.23 | 5.71 |
| Fat | 6.07 | 5.04 | 4.54 | 3.17 | 2.27 |
| Raw fiber | 9.44 | 13.88 | 21.89 | 17.52 | 30.59 |
| Ash | 11.88 | 10.53 | 9.13 | 8.52 | 7.65 |
| Vitamin C mg/100 g | 792.05 | 760.41 | 311.86 | 149.17 | 160.72 |
| Carotone mg/100 g | 55.48 | 57.69 | 58.61 | 31.28 | 20.34 |

Analysis of various amino acids in them arm shown as following Table 2

TABLE 2

| Asp | Thr | Ser | Glu | Gly | Ala | Cys | Val | Met |
|---|---|---|---|---|---|---|---|---|
| 1.219 | 0.735 | 0.785 | 3.084 | 0.880 | 0.880 | 0.145 | 1.075 | 0.078 |

| Ile | Leu | Tyr | Phe | Lys | Trp | His | Arg | Pro | Total |
|---|---|---|---|---|---|---|---|---|---|
| 0.810 | 1.313 | 0.379 | 1.122 | 1.027 | — | 0.496 | 0.797 | 0.625 | 15.45 |

In addition, the clorophyll content in hybrid *Rumex acetosa* L. is also very high, with higher concentration of organo-selenium and a lot of microelements beneficial to human being health, as shown in Table 3.

TABLE 3

| Protein % | Fiber % | Fat % | Nitrogen from extracts % | Vitamin C mg/100 g | β Carotone mg/100 g |
|---|---|---|---|---|---|
| 28.72 | 12.27 | 4.54 | 36.31 | 135.64 | 41.43 |
| Ca % | Mg % | Cu μg/g | Fe μg/g | Zn μg/g | Mn μg/g |
| 1.59 | 0.062 | 10.67 | 604.99 | 59.59 | 43.36 |
| Se μg/g | | | | | |
| 0.556 | | | | | |

Therefore, hybrid *Rumex acetosa* L. is an excellent new breed herb with rich nutrition.

The inventor of this application discovers in practice that the water content of hybrid *Rumex acetosa* L., especially fresh hybrid *Rumex acetosa* L., is as high as 89–90%, thus this plant will possess very good prospect for preparing beverage.

Thus, an object of this invention is to provide pure natural plant beverage with rich nutrition prepared from hybrid *Rumex acetosa* L.

DESCRIPTION OF THE INVENTION

In one aspect of the invention, there is provided use of *Rumex acetosa* L. in production of original juice beverage.

In another aspect of the invention, there is provided use of *Rumex acetosa* L. in production of fill pulp beverage.

The invention is implemented by following sequences: Fresh hybrid *Rumex acetosa* L. is squeezed and its juice is used as raw materials for preparing beverage The result product will be purely natural green beverage with rich nutrition, good appearance and good taste. The practical preparation method is as follows. The hybrid *Rumex acetosa* L. is washed and added with water and then squeezed into juice, which is heated at 90~100° C. The precipitate is filtered out by pressure-filter device with selected fine filter-net and the result filted juice is the so-called original juice beverage.

The prepared original juice beverage can be further blended to different tastes to fit different requirements of tastes and different features in different people groups.

For instance, for children and infants, the juice is added with 5–6% of caster sugar, 0.1–0.15% of citric acid and 0.1–0.3% of preservative such as potassium sorbic acid and sodium sulphite, based on the total original juice beverage. Beverage of this recipe appears tart-sweet taste and rich in vitamins, carotene, ionized amino acid and microelements such as selenium etc. It can be used to supplement the deficient intake Of vitamins and carotene due to children's partiality in foods and is beneficial to children's nutrition balance, physical power strengthening, height growing and intellectual development. It belongs to natural nutritious green beverage.

Another example is taken for old age people according to their features. A little amount of refined salt and sugar is added into original juice beverage, to let its palate a little salty sweet. This kind of beverages belongs to low sugar type beverage which is rich in vitamins, carotene, free amino acids, and microelements such as selenium. That can be helpful for old age people to increase the intake amount of such nutrition and thus to intensify physical strength, lengthen longevity and prevent from senile dementia.

It is also possible to process the original juice as carbonate type beverage to meet the preferable taste requirements of common people. Thus it can be prepared as a thirsty checking cold drink, supplementing quickly water and nutritious substances in the body, and making physical strength recovering.

The invention also provides a new application of hybrid *Rumex acetosa* L. for preparing full pulp beverage. The preparation method is as follows. Hybrid *Rumex acetosa* L. is treated in color protection and preheating processes. With a proportion of hybrid *Rumex acetosa* L.: water=1:1~2 by weight, the mixture is beated, regulated to appropriate pH, homogenized, canned, sterilized, and cooled. The result product is full pulp type beverage. In flier processing stabilizers can also be added.

This kind of beverages contains solid substance with tart sweet taste, suitable for male, female, old age and children. It is rich in nutrition, providing large amount of protein, amino acid, vitamins, carotene, mineral Ca and P, microelement selenium and little amount of fiber, and thus belongs to the type of pure natural green beverage with the function of providing nutrition and maintaining health.

The beverage prepared from hybrid *Rumex acetosa* L. according to the invention contains rich vitamins, carotene, mineral elements, organic selenium and other nutritious substances, and is the type of pure natural, nutritious and health keeping beverage.

The other aspect of the invention provides a use for preparation of compound amino acid beverage from hybrid *Rumex acetosa* L.

The said preparation method of compound amino acid beverage from hybrid *Rumex acetosa* L. is as follows: Hybrid *Rumex acetosa* L. is processed by color protection and pre-heating, then by pulp beating and filtering. The filtered liquid is hydrolyzed added with enzyme, purified for enzyme, separated by centrifuge, filtered, regulated to appropriate pH, instantly sterilized at high temperature, canned, sealed, sterilized and cooled. The final product is the desired product.

This kind of beverages has tart sweet taste, suitable for male, female, old age, and children. Its rich plant proteins are hydrolyzed into ionized amino acid, suitable for quick absorption and utilization by human body. It can be used for compensation of various amino acids necessary for human body. With the combination of added vitamins and carotene, it is a pure natural green beverage with rich nutrition.

Nutritious constituents in all prepared beverage, analyzed by the Central Lab of Xin Jiang Agricultural Science Academy & Agricultural Product Quality Supervision Inspection & Test Center, are shown in Table 4 & Table 5:

TABLE 4

| Vitamin C mg/100 g | Vitamin B1 μg/g | Vitamin B2 μg/g | P mg/100 g | Fe mg/L |
|---|---|---|---|---|
| 0.55 | 0.03 | 0.34 | 7.94 | 2.28 |

| Mn mg/L | Zn mg/L | Mg mg/L | Ca mg/L | |
|---|---|---|---|---|
| 0.432 | 5.40 | 2.09 | 5.84 | |

TABLE 5

| Asp | Thr | Ser | Glu | Gly | Ala |
|---|---|---|---|---|---|
| 0.0030 | 0.0016 | 0.0019 | 0.0118 | 0.0014 | 0.0020 |
| Cys | Val | Met | Ile | Leu | Tyr |
| * | 0.0636 | * | * | 0.0013 | 0.0074 |
| Phe | Lys | Trp | His | Arg | Pro | Total |
| * | 0.06 | ** | * | * | — | 0.0365 |

*means undetectable;
**means neglectable.

The invention on will be explained further with the following examples.

BEST EMBODIMENT OF THE INVENTION

EXAMPLE 1

Preparation of Original Juice Beverage from Hybrid *Rumex Acetosa* L.

After hybrid *Rumex acetosa* L. is washed, the same volume water is added into it. Then the juice is squeezed from it and heated at 90~100° C. for 5 min. The precipitate is filtered out by a pressure filter with selected fine filtering net. The filter juice is the desired original juice beverage.

EXAMPLE 2

In 1000 cc of original juice beverage as prepared in example 1, 50 g of caster sugar, 1 g of citric acid and 3 g of potassium sorbic acid as preservative are added, then a new beverage is obtained.

The beverage has a tart sweet taste and contains rich vitamins, carotene, ionized amino acid and microelements etc when analyzed.

EXAMPLE 3

In 1000 cc of original juice beverage as prepared in example 1, refined salt and sugar is added. The result is a low sugar type beverage.

The beverage appears a little salty and sweet. It contains vitamins, carotene, ionized amino acid and selenium and other microelements.

EXAMPLE 4

1000 cc of original juice beverage as prepared in example 1 is processed into carbonate type beverage.

EXAMPLE 5

Preparation of Full Pulp Beverage from Hybrid *Rumex acctosa* L.

A certain amount of hybrid *Rumex acetosa* L. is processed for color protection and pre-heating. With a proportion of hybrid *Rumex acetosa* L.: water=1:1~2 (w/w), the mixed substance is beat, regulated to appropriate pH, homogenized, sterilized. The final product is the desired fall pulp beverage.

This full pulp beverage can be further blended with stabilizer and then homogenized, canned, sterilized, and cooled.

This kind of beverages appears tart sweet taste, with solid substance in it.

EXAMPLE 6

Preparation of Compound Amino Acid Beverage from Hybrid *Rumex acetosa* L.

Hybrid *Rumex acetosa* L. is processed for color protection and pre-heating, and then beat and filtered. The filter liquid is hydrolyzed added with enzyme, purified for enzyme, separated by centrifuge, filtered, regulated to appropriate pH, instantly sterilized at high temperature, canned, scaled, sterilized and cooled. The final product is the desired product.

This kind of beverages has a tart sweet taste. Its rich plant proteins from hybrid *Rumex acetosa* L. are hydrolyzed into ionized amino acid, suitable for quick absorption and utilization by human body. It is very good for compensation of various amino acids necessary for human body. With further combination with added vitamins and carotene, it can be processed into a pure natural and green beverage with rich nutrition.

INDUSTRIAL APPLICATION

The plant type beverage prepared from hybrid *Rumex acetosa* L. according to the invention can be practically produced in industry scale.

What is claimed is:

1. A beverage comprising hybrid *Rumex acetosa* L. prepared by the process comprising the steps of washing and squeezing the hybrid *Rumex acetosa* L. and recovering the resultant beverage, wherein the female parent of the hybrid *Rumex acetosa* L. is *Rumex patienia* L., and its male parent is *Rumex tianschanica* L.

2. A beverage according to claim 1 further comprising adding carotene to said beverage.

3. A beverage according to claim 1 further comprising ionized amino acids from hydrolyzed protein of the hybrid *Rumex acetosa* L.

4. A full pulp beverage comprising hybrid *Rumex acetosa* L. prepared by the process comprising the steps of washing and beating the hybrid *Rumex acetosa* L. and water to form a full pulp beverage, wherein the female parent of the hybrid *Rumex acetosa* L. is *Rumex patienia* L., and its male parent is *Rumex tianschanica* L.

5. A beverage according to claim 4 further comprising the step of adding carotene to the full pulp beverage.

6. A beverage according to claim 4 further comprising ionized amino acids from hydrolyzed protein of the hybrid *Rumex acetosa* L.

7. A method of preparing a beverage comprising hybrid *Rumex acetosa* L. comprising the steps of washing hybrid *Rumex acetosa* L. with water;

beating or squeezing the hybrid *Rumex acetosa* L. to form a beverage; and recovering the beverage.

8. A method of preparing a beverage according to claim 7 further comprising the step of adding enzymes to hydrolyze the protein of said hybrid *Rumex acetosa* L. to its corresponding amino acids.

* * * * *